United States Patent

Shimamura et al.

[11] Patent Number: 5,713,638
[45] Date of Patent: Feb. 3, 1998

[54] BRAKE SYSTEM WITH A POWER BRAKE DEVICE

[75] Inventors: Morihiko Shimamura; Yoshiyuki Hiratsuka, both of Saitama, Japan

[73] Assignee: Jidosha Kiki Co., Ltd., Tokyo, Japan

[21] Appl. No.: 592,495

[22] Filed: Jan. 26, 1996

[30] Foreign Application Priority Data

Feb. 10, 1995 [JP] Japan ................... 7-046142

[51] Int. Cl.⁶ ........................................... B60T 13/74
[52] U.S. Cl. ........................... 303/3; 188/152; 188/356
[58] Field of Search ........................... 188/158, 159, 188/151 R, 152, 355–358, 156, 189; 303/3, 113.4, 114.3, 198, 22.1, 22.8; 318/370, 371; 91/376 R, 369.1, 376; 60/547.1

[56] References Cited

U.S. PATENT DOCUMENTS 4,560,210 12/1985 Tani .......................... 303/22 R

FOREIGN PATENT DOCUMENTS

| 62279164 | 12/1987 | Japan | ................... 303/114.3 |
| 2-123902 | 5/1990 | Japan. | |
| 4138961 | 9/1990 | Japan | ................... 303/114.3 |
| 1160354 | 8/1969 | United Kingdom. | |

Primary Examiner—Robert J. Oberleitner
Assistant Examiner—C. T. Bartz
Attorney, Agent, or Firm—Sughrue, Mion, Zinn, Macpeak & Seas, PLLC

[57] ABSTRACT

A valve seat (50) is provided on and along the end face of the end tubular portion (16a) of the valve body (16) of a power brake device. A valve member (49) is slidably put on the input shaft (8). The valve member (49) is moved forward and backward by an actuator (51). When the valve member (49) is seated on the valve seat (50), the valve member (49) closes a pressure path (35). In this state, the operation of amplifying a braking force by the power brake device is not performed. The brake system may be incorporated into a vehicle with a regenerative brake device. The operation of amplifying a braking force by the power brake device can be interrupted. Therefore, the brake system produces a braking force optimal for a current loading state of a vehicle. The braking force amplifying operation of the power brake device can be stopped until the regenerative brake device produces a large regenerative braking force. Therefore, the regenerative braking force can be effectively used.

11 Claims, 6 Drawing Sheets

BRAKE SYSTEM WITH A POWER BRAKE DEVICE

BACKGROUND OF THE INVENTION

The present invention relates to a braking control system, and more particularly to a braking control system with a power brake device.

A brake system having a power brake device for amplifying a force applied to the brake pedal and a master cylinder for generating a fluid pressure when it is driven by the power brake device, is well known.

The power brake device generally includes a valve body being slidably provided within a shell and having an end tubular portion at the rear end thereof, which is extended outside the shell, a power piston being provided on the outer surface of the valve body, and defining a pressure chamber formed on the front side thereof in the operation direction and a variable pressure chamber formed on the rear side thereof, a valve mechanism, provided within the valve body, for selecting a fluid path, a pressure path being formed in the end tubular portion and opened to the air, and an input shaft for driving the valve mechanism to select a fluid path, whereby air is supplied from the pressure path to the variable pressure chamber through the selected fluid path, to thereby move forward the power piston.

In an electric motor vehicle, the brake system with the power brake device is used in combination with a regenerative brake device. The brake system for braking the electric motor vehicle is made up of a mechanical brake device including a power brake device for amplifying a force applied to the brake pedal and a master cylinder for generating a fluid pressure when it is driven by the power brake device, a sensor for sensing an amount of the depressing movement of the brake pedal, and a regenerative brake device for controlling a regenerative braking force in accordance with the amount of the depressing movement of the brake pedal, sensed by the sensor (Published Unexamined Japanese Patent Application No. Hei. 2-123902). To detect how far the brake pedal is depressed, sensing means is used for sensing a depressing force applied to the brake pedal, a brake fluid pressure varying with the depressing force, or an amount of the depressing movement of the brake pedal.

In the operation of the brake system for this type of the electric motor vehicle, a regenerative braking force of the regenerative brake device is varied in accordance with a quantity of the depressing movement of the brake pedal before the mechanical brake device starts to operate, and it is kept at a fixed value after the mechanical brake device operates to generate a braking force.

In such a motor vehicle as a truck, a braking force required when it is loaded with goods is greatly different from that required when it is not loaded. However, in the above-mentioned brake system with the power brake device, the ratio of the power amplification by the power brake device is constant, to make it difficult to obtain suitable braking force for both of the loaded and no-loaded states.

In the brake system used for the electric motor vehicle, a regenerative braking force of the regenerative brake device is increasingly varied in accordance with an amount of the depressing movement of the brake pedal only before the mechanical brake device starts to operate. Because of this, it is impossible to increase the regenerative braking force when the mechanical brake device starts to operate. In this respect, the regenerative braking force of the regenerative brake device cannot be used effectively.

An intention to effectively use the regenerative braking force by increasing the regenerative braking force at the start of the operation of the mechanical brake device, can be achieved by designing the brake system such that the mechanical brake device does not operate until the brake pedal is greatly depressed. Large set loads of the return springs of the master cylinder and the power brake device in the mechanical brake device enables the mechanical brake device to operate in such a way.

Where the set loads of the return springs are set large, if the regenerative brake device fails to operate, the mechanical brake device does not generate a braking force until the brake pedal is greatly depressed, and the driver feels an insufficient braking.

SUMMARY OF THE INVENTION

Accordingly, an object of the present invention is to provide a brake system with a power brake device which can vary braking force as required, for instance, for a truck which requires the greatly different braking force between the loaded state and the unloaded state.

Another object of the present invention is to provide a brake system with a power brake device which, when incorporated to an electric motor vehicle, effectively uses a regenerative braking force of the regenerative brake device by increasing the regenerative braking force when the mechanical brake device starts the braking operation, and is able to operate the mechanical brake device by a small amount of the depressing movement of the brake pedal even if the regenerative brake device fails to operate.

The first aspect of the invention improves a conventional brake system having a power brake device in that a valve seat is provided on and along the end face of the end tubular portion of the valve body, while partially defining the pressure path, a valve member is slidably put on the input shaft, and when the valve member is seated on the valve seat, the valve member closes the pressure path, and an actuator is further provided for moving forward and backward the valve member. The second aspect of the invention improves a brake system having a power brake device, and further a sensor for sensing an amount of the depressing movement of the brake pedal, and a regenerative brake device for controlling a regenerative braking force in accordance with an amount of the depressing movement sensed by the sensor, in that a valve seat is provided on and along the end face of the end tubular portion of the valve body, while partially defining the pressure path, a valve member is slidably put on the input shaft, and when the valve member is seated on the valve seat, the valve member closes the pressure path, and an actuator is further provided which closes the pressure path by seating the valve member on the valve seat before a regenerative braking force generated by the regenerative brake device reaches a preset value, and opens the pressure path by detaching the valve member from the valve seat when the generated regenerative braking force reaches the preset value.

In the first aspect of the invention, when the vehicle is in a loaded state, the actuator is manually or automatically operated to detach the valve member from the valve seat. In this state, the pressure path of the power brake device is opened. The power brake device exercises the braking force amplifying function, to generate a large braking force.

When the vehicle is empty or in a nonloaded state, the actuator is operated to seat the valve member on the valve seat, to close the pressure path. In this state, the power brake device does not exercise the braking force amplifying function. Accordingly, the braking force produced is controlled to be optimal for the empty state of the vehicle.

In the second aspect of the invention, when the brake pedal is depressed, the power brake device quickly responds to the pedal depression to generate a regenerative braking force which depends on how far the pedal is depressed. In the mechanical brake device, the actuator of the power brake device closes the pressure path by seating the valve member on the valve seat before a regenerative braking force generated by the regenerative brake device reaches a preset value. Therefore, if in response to the pedal depression, the valve mechanism is driven to connect the pressure path to the variable pressure chamber, no air is introduced into the variable pressure chamber. The power brake device does not exercise the braking force amplifying function. Therefore, the braking force by the mechanical brake device is kept small. The braking action by the regenerative brake device is effectively performed.

When the generated regenerative braking force reaches the preset value, the actuator opens the pressure path by detaching the valve member from the valve seat. Air is introduced into the variable pressure chamber, through the pressure path. Consequently, the power brake device exercises the braking force amplifying function so that a braking force by the mechanical brake device increases, whereby the mechanical brake device increases the braking force subsequently.

If the regenerative brake device fails to operate, the valve member is detached from the valve seat to leave the pressure path open. In this state, if the brake pedal is depressed to drive the valve mechanism, the power brake device immediately produces an amplified braking force. Therefore, the driver feels a stable braking operation from a state that the amount of the brake pedal depression is small.

DETAILED DESCRIPTION OF THE PREFERRED EMBODIMENTS

Figure 1:
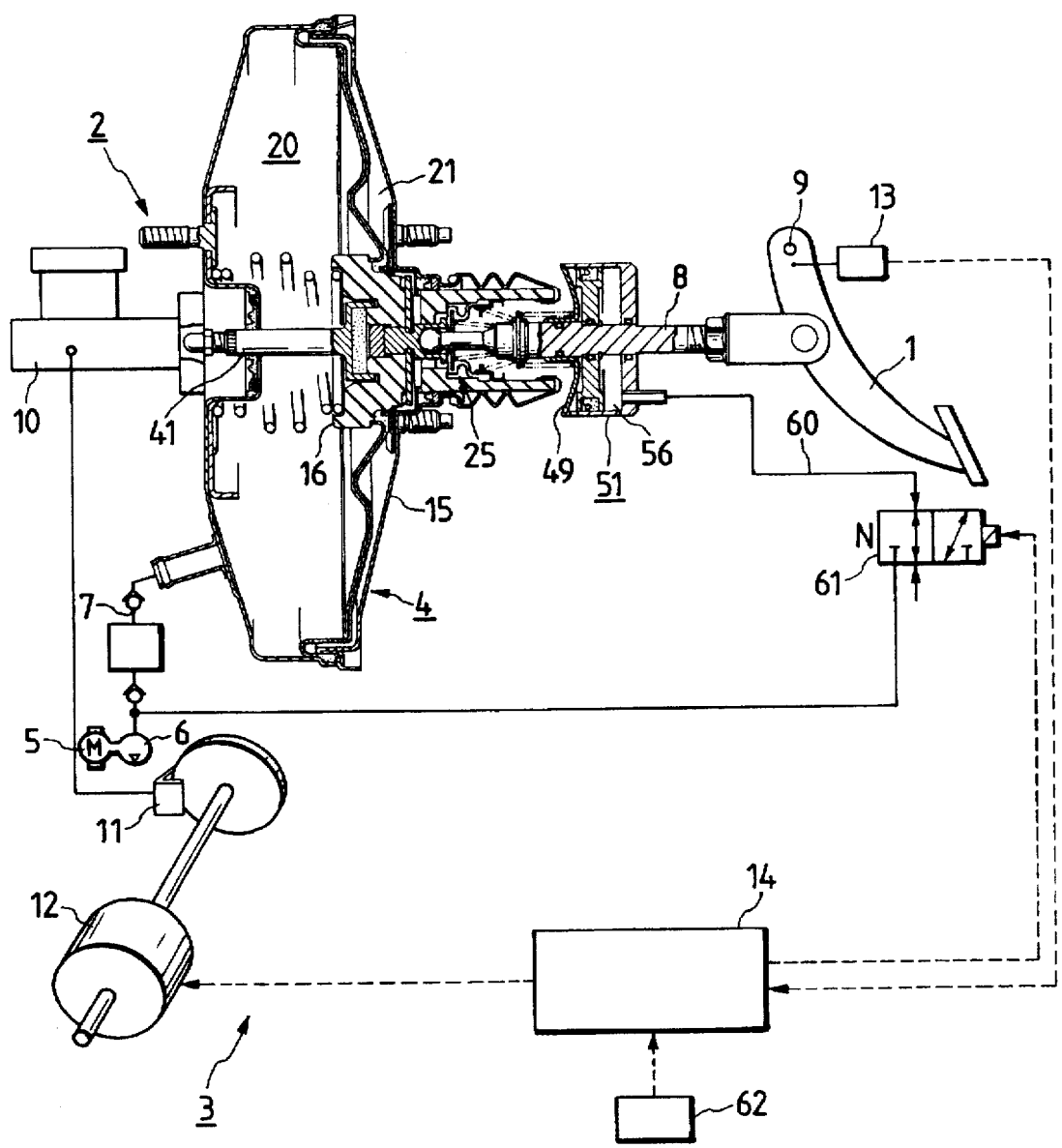
FIG. 1 is a schematically view showing a brake system according to a first embodiment of the present invention.

An embodiment of the present invention will be described with reference to accompanying drawings. In the embodiment, the present invention is incorporated into a brake system for an electric motor vehicle. Reference is made to FIG. 1 showing the brake system of the present embodiment. As shown, the brake system is made up of a mechanical brake device 2 and a regenerative brake device 3. The mechanical brake device 2 varies a mechanical braking force in accordance with a force applied to a brake pedal 1. The regenerative brake device 3 varies a regenerative braking force in accordance with an amount of the depressing movement of the brake pedal 1.

The mechanical brake device 2 includes a well known power brake device 4 of the negative-pressure type which will be described later. The power brake device 4 receives a negative pressure from a negative pressure supply source 6, e.g., a pump, driven by a motor 5, through a negative pressure path 7. An input shaft 8 of the power brake device 4 is coupled with the brake pedal 1, which is swung about a pin 9. The power brake device 4 amplifies a depressing force that is applied to the input shaft 8 from the brake pedal 1, and transfers the amplified braking force to a master cylinder 10. A fluid pressure that is generated in the master cylinder 10 is supplied to a wheel cylinder 11 of the wheel, to thereby brake the wheel.

As well known, the regenerative brake device 3 utilizes a drive motor 12 for driving the wheels of the electric motor vehicle for the regenerative braking operation. The regenerative brake device 3 includes a control unit 14, which receives a signal from a stroke sensor 13 for detecting an amount of the depressing movement of the brake pedal 1. When a driver, for example, steps on the brake pedal 1, the control unit 14 increases a regenerative braking force of the regenerative brake device 3 up to the maximum regenerative braking force, in accordance with the increase of the amount of the depressing movement of the brake pedal 1. After the maximum regenerative braking force is reached, the control unit keeps the regenerative braking force at the maximum value even if the brake pedal 1 is further depressed.

Figure 2:
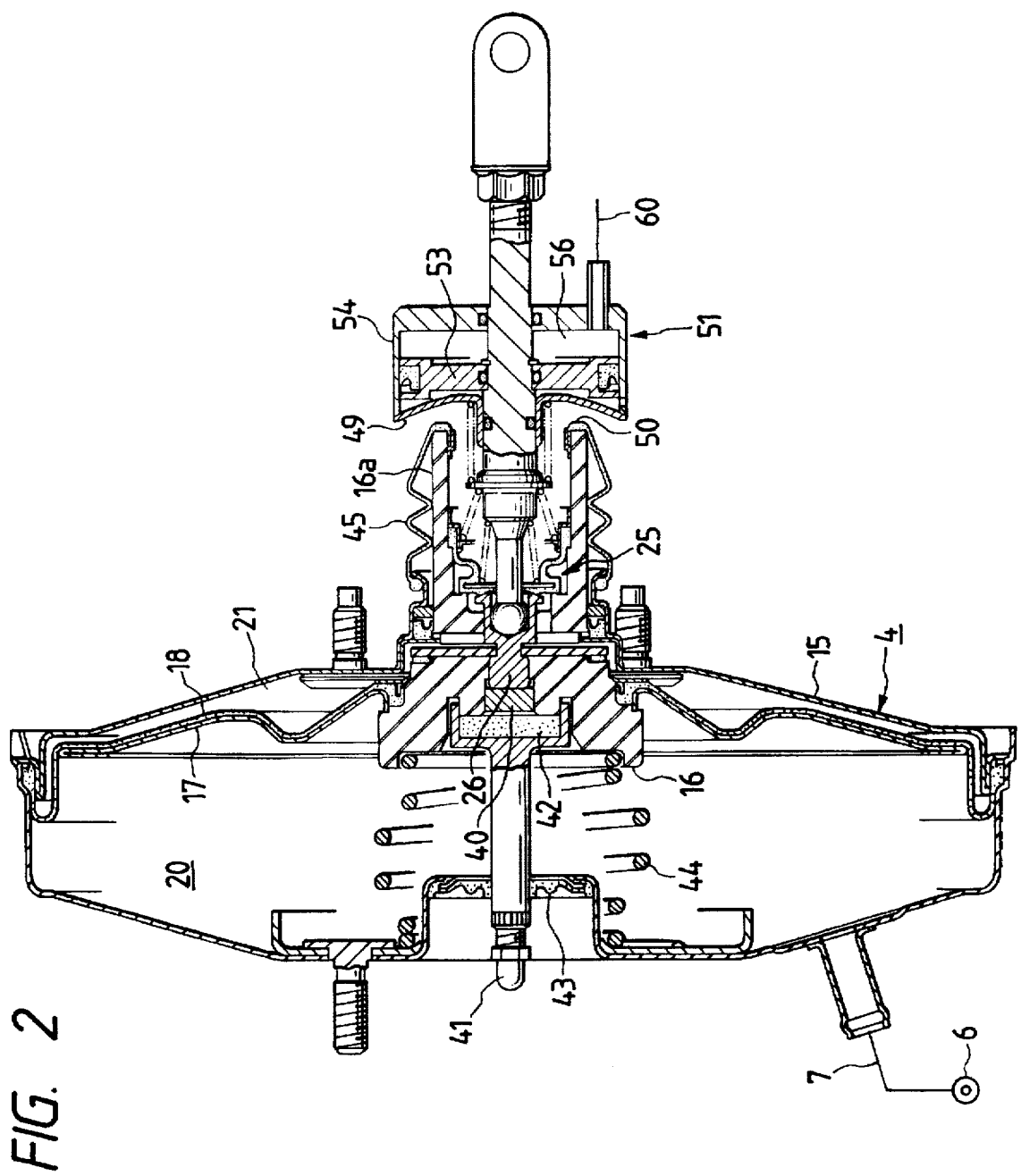
FIG. 2 is an enlarged sectional view showing a braking-force doubling device in the brake system of FIG. 1.

As shown in FIG. 2, the power brake device 4 includes a valve body 16, which is slidably movable within a shell 15. A rear end tubular part 16a of the valve body 16 is protruded outside from an opening of the shell 15. A power piston 17 is put on the outer surface of the valve body 16. A diaphragm 18 is attached to the rear side of the power piston 17. The combination of the power piston 17 and the diaphragm 18 partitions the inner space of the shell 15 into a fixed pressure chamber 20 and a variable pressure chamber 21. The fixed pressure chamber 20 is located on the front side (when seen in the operation direction), while the variable pressure chamber 21 is located on the rear side. A negative pressure is applied from the negative pressure supply source 6 to the fixed pressure chamber 20, by way of the negative pressure path 7 (FIG. 1).

Figure 3:
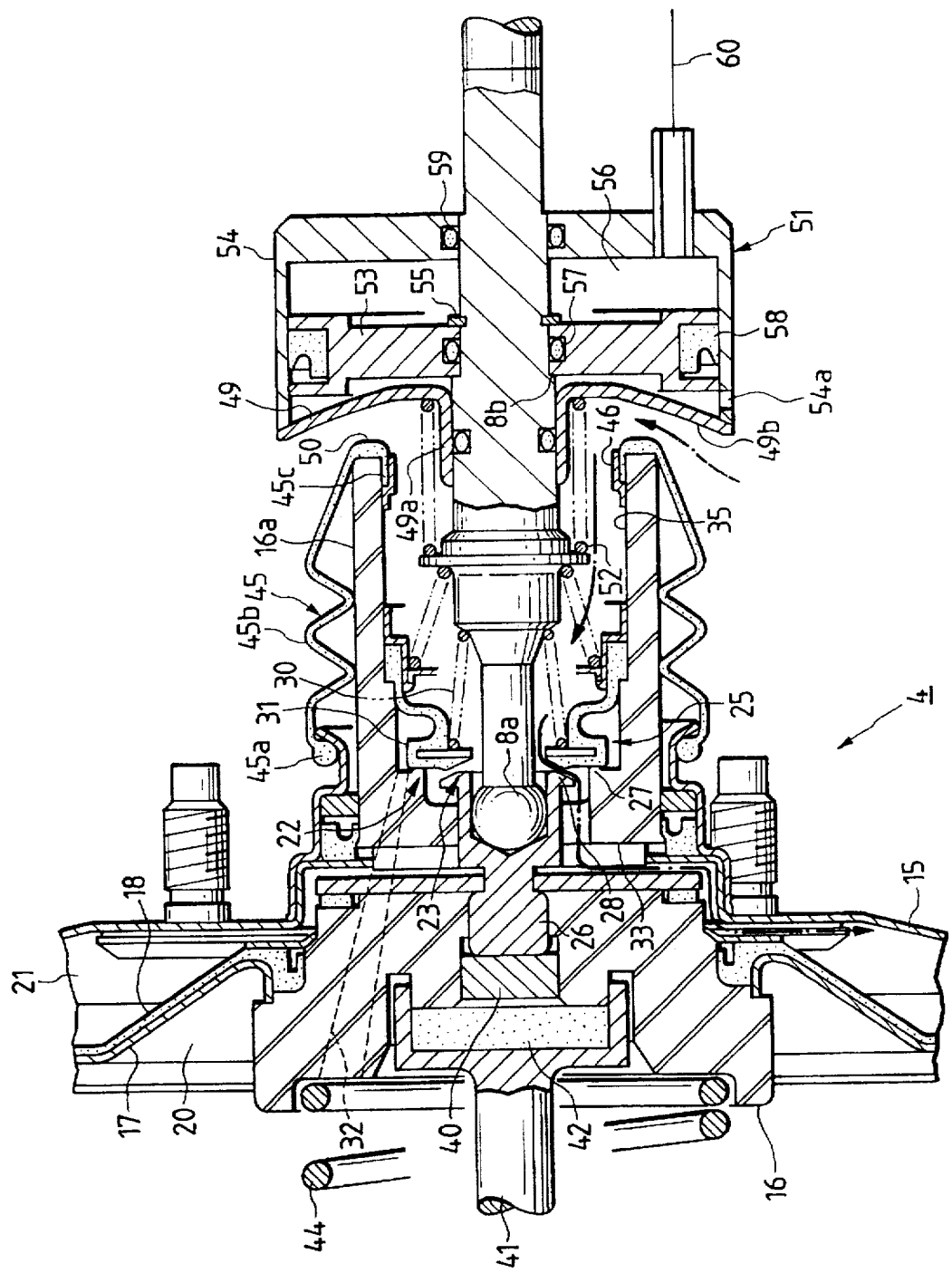
FIG. 3 is an enlarged sectional view showing a key portion of the braking-force doubling device shown in FIG. 2.

A well known valve mechanism 25 is generally made up of a vacuum valve 22 and an atmospheric valve 23, and is provided within the valve body 16, as shown in enlarged form in FIG. 3. The valve mechanism 25 further includes a valve plunger 26, a first valve seat 27, a second valve seat 28, and a valve body 31. The valve plunger 26 is slidably inserted into the valve body 16. The first valve seat 27 is formed on the inner wall of the valve body 16, and serves as the vacuum valve 22. The second valve seat 28 is formed on the rear side of the valve plunger 26, and serves as the atmospheric valve 23. The valve body 31, when urged to the left by a spring 30, is seated on the first valve seat 27 or the second valve seat 28.

The outer side of the seat portion of the first valve seat 27 and the valve body 31 is communicatively connected to the fixed pressure chamber 20, through a fixed pressure path 32 formed in the valve body 16. A portion between the seat portion of the first valve seat 27 and the valve body 31, and the seat portion of the second valve seat 28 and the valve body 31 is communicatively connected to the variable pressure chamber 21, through a pressure varying path 33 formed in the valve body 16. The inner side of the seat portion of the second valve seat 28 and the valve body 31 is communicatively connected to the atmosphere, through a pressure path 35 formed within an end tubular portion 16a.

A globular end 8a of the input shaft 8 is pivotally coupled with the valve plunger 26, so that when the brake pedal 1 is depressed, the input shaft 8 advances and pushes the valve plunger 26 at the globular end 8a thereof, while the pivotal motion of the input shaft 8 with respect to the valve plunger 26 can be permitted. The fore end of the valve plunger 26 faces, through a plate plunger 40, a reaction disk 42 which is placed within a concavity formed in the base part of an output shaft 41. The output shaft 41 is extended outside from the shell 15, through a sealing member 43 (FIG. 2), and coupled with a piston (not shown) of the master cylinder 10 (FIG. 1). A return spring 44 is resiliently located between the valve body 16 and the shell 15. The return spring 44 urges the valve body 16 so that it is held at an inoperative position as shown.

The end tubular portion 16a, which is extended outside through the opening of the shell 15, is covered with a dust cover 45. The dust cover 45 includes a thick, bead part 45a at the left end, and a bellows portion 45b occupying the middle portion thereof. The bead part 45a of the dust cover 45 is fixed to the opening part of the shell 15. The right end portion of the bellows portion 45b is bent to cover the right end part of the end tubular portion 16a. The right end portion of the bellows portion 45b is bent inwardly to cover the end face of the end tubular portion 16a, and a thicker part 45c of the right end portion of the bellows portion 45b is retained thereto by a retainer 46.

In the present embodiment, a valve member 49, shaped like a dish, is slidably put on the input shaft 8. An actuator 51 is provided, which functions to move forward the valve member 49, and seats it on a valve seat 50 to close the pressure path 35. The valve seat 50 is provided on and along the right end face of the end tubular portion 16a of the valve body 16. A spring 52 is placed between the valve member 49 and a stepped part of the input shaft 8. The spring 52 constantly urges the valve member 49 toward the actuator 51. By the urging force of the spring 52, normally, the valve member 49 is being separated from the valve seat 50, and hence the pressure path 35 is left open.

The valve seat 50 is formed using a part of the bent right end portion of the dust cover 45, which is bent to extend onto the inner side of the right end part of the end tubular portion 16a. The valve seat 50 defines an opening of the pressure path 35 to the air. The valve member 49 includes a tubular slider portion 49a extended forwardly along the circumferential outer surface of the input shaft 8, and a valve body 49b radially expanded from the right end of the tubular slider portion 49a. The valve body 49b is designed to be brought into contact with the valve seat 50. The valve body 49b is spherical and curved about the globular end 8a at the top of the input shaft 8 as a center. With this shape of the valve body 49b, the valve body 49b is reliably brought into contact with the valve seat 50 even if the input shaft 8 is tilted or pivoted with respect to the valve plunger 26.

The actuator 51 includes a piston 53 and a cylinder 54. The piston 53 is fixed to the input shaft 8 by means of a stepped part 8b of the input shaft 8 and a retainer 55 mounted on the input shaft 8. The cylinder 54 is slidably movable relative to the input shaft 8 and the piston 53 fixed to the input shaft 8. The cylinder 54 is coupled at the left end with the valve member 49.

The piston 53 is slidably fit into the cylinder 54. A pressure chamber 56 is formed on the right side of the piston 53. The pressure chamber 56 is sealed with sealing members 57 and 58 provided on the inner and the outer surfaces of the piston 53, and a sealing member 59 between the cylinder 54 and the input shaft 8. The pressure chamber 56 is connected through a flexible conduit 60 to a path select valve 61, which is under control of the control unit 14 (FIG. 1). The chamber on the left side of the piston 53 is continuous to the air through an opening 54a of the cylinder 54 (FIG. 3).

Normally, the path select valve 61 connects the pressure chamber 56 to the air, and the space within the pressure chamber 56 is at the atmospheric pressure. When it is energized by the control unit 14, the path select valve 61 selects a path, which connects the pressure chamber 56 to the negative pressure supply source 6. Accordingly, a negative pressure is introduced into the pressure chamber 56, from the negative pressure supply source 6.

The control unit 14 receives a signal from a speed sensor 62 for sensing a vehicle speed.

With such a construction, in a state that the brake pedal 1 is not depressed, the control unit 14 deenergizes the path select valve 61 to open the pressure path 35.

In this state, if the brake pedal 1 is depressed, the stroke sensor 13 senses an amount of the depressing movement of the brake pedal 1. When the amount of the depressing movement of the brake pedal 1 is smaller than a preset value and a vehicle speed sensed by the speed sensor 62 is higher than a preset speed, the path select valve 61 is driven to introduce a negative pressure into the pressure chamber 56.

Then, the cylinder 54 moves the valve member 49 to the left against the resilient force of the spring 52, so that the valve member 49 is seated on the valve seat 50 of the end tubular portion 16a. Therefore, in the mechanical brake device 2, when the brake pedal 1 is depressed, the vacuum valve 22 is closed and the atmospheric valve 23 is opened, and the pressure path 35 is communicatively connected to the variable pressure chamber 21, but the pressure path 35 is closed by the valve member 49, so that air is not introduced into the variable pressure chamber 21. Consequently, the power brake device 4 does not operate for amplifying the braking force.

On the other hand, when the brake pedal 1 is depressed, the control unit 14 responds to a signal from the stroke sensor 13 and immediately drives the regenerative brake device 3 to operate for the regenerative operation. At this time, the pressure path 35 is left closed and the power brake device 4 does not amplify the braking force. The braking force by the mechanical brake device 2 is kept at the minimum force. Accordingly, the braking force by the regenerative brake device 3 is effectively used. During this period, the control unit 14 increases the regenerative braking force up to the maximum value thereof, with increase of the amount of the depressing movement of the brake pedal 1.

Also during this period, if the stroke sensor 13 detects that the amount of the depressing movement of the brake pedal 1 exceeds the preset value, the control unit 14 recognizes that a large braking force is required, and deenergizes the path select valve 61 to introduce air into the pressure chamber 56. Since the spring 52 urges the valve member 49 to disengage from the valve seat 50 of the end tubular portion 16a of the valve body, air is introduced into the variable pressure chamber 21 through the pressure path 35, the valve mechanism 25, and the pressure varying path 33, as indicated by the arrows shown in FIG. 3. Subsequently, the power brake device 4 will apply a large braking force to the wheels.

In a case where the vehicle speed is not more than the preset value when the brake pedal 1 is depressed, the path select valve 61 is left deenergized irrespective of the amount of the depressing movement of the brake pedal 1, and the pressure path 35 is left open. Accordingly, in this case, the power brake device 4 performs the operation of amplifying the braking force.

In the above-mentioned embodiment, the power brake device 4 is assembled into the brake system including the regenerative brake device 3 which controls a regenerative braking force. The power brake device 4 may be assembled into the brake system not including the power brake device 4, as a matter of course.

In a specific example, the power brake device 4 including the valve member 49 and the actuator 51 is incorporated into the brake system of a truck. When the truck is loaded with goods, the valve member 49 is detached from the valve seat 50, so that the power brake device 4 generates a large braking force. When the truck is loaded with no goods or empty, the valve member 49 is seated on the valve seat 50, to prohibit the operation of the power brake device 4. In this state, an excessive braking force is not applied, and hence the wheels are not locked.

In this case, the operation of the actuator 51 is automatically controlled using a load sensor for sensing a loaded state or a nonloaded state of the truck. Alternatively, the actuator 51 may be operated manually, of course.

Figure 4:
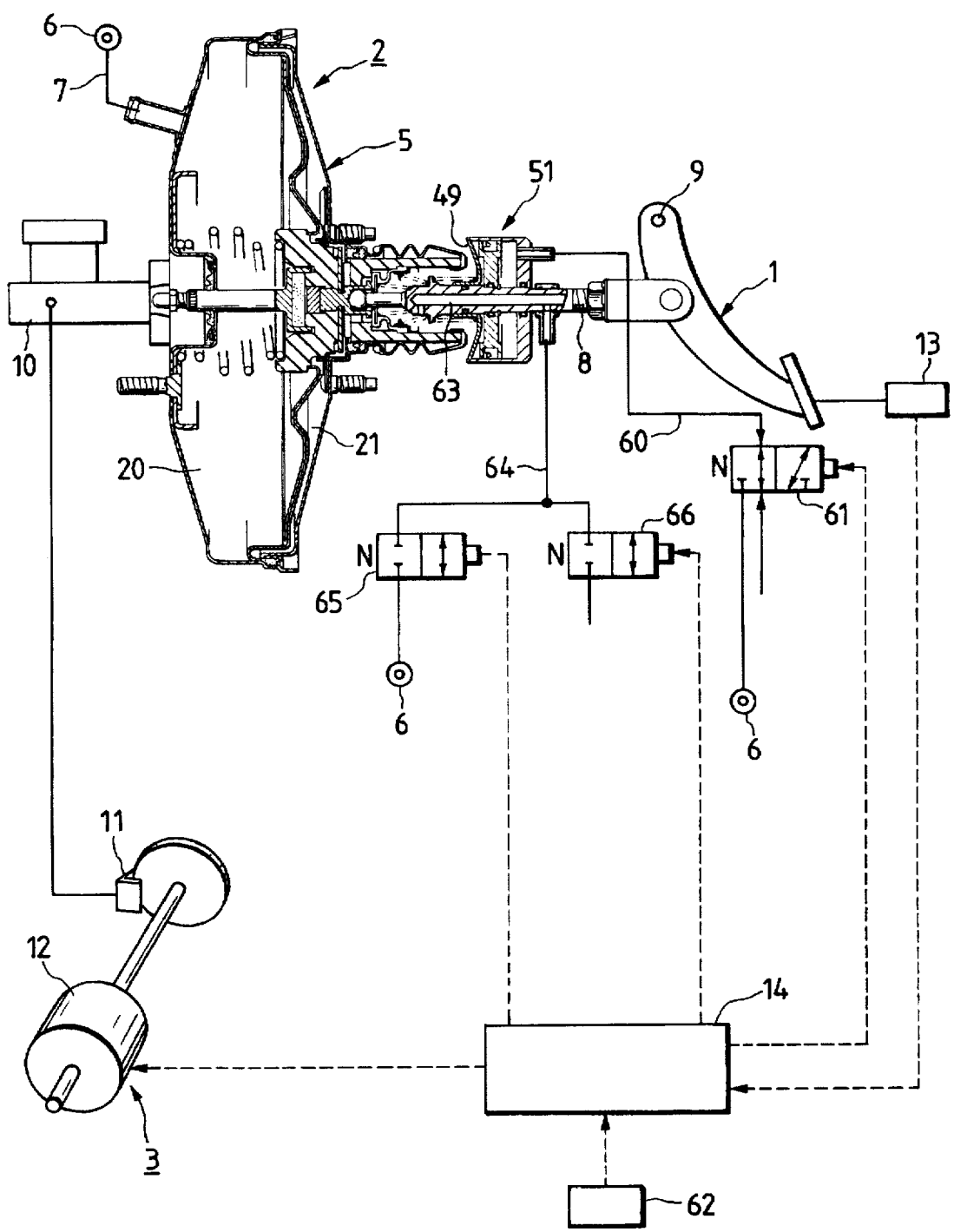
FIG. 4 is a schematically view showing a brake system according to a second embodiment of the present invention.
Figure 5:
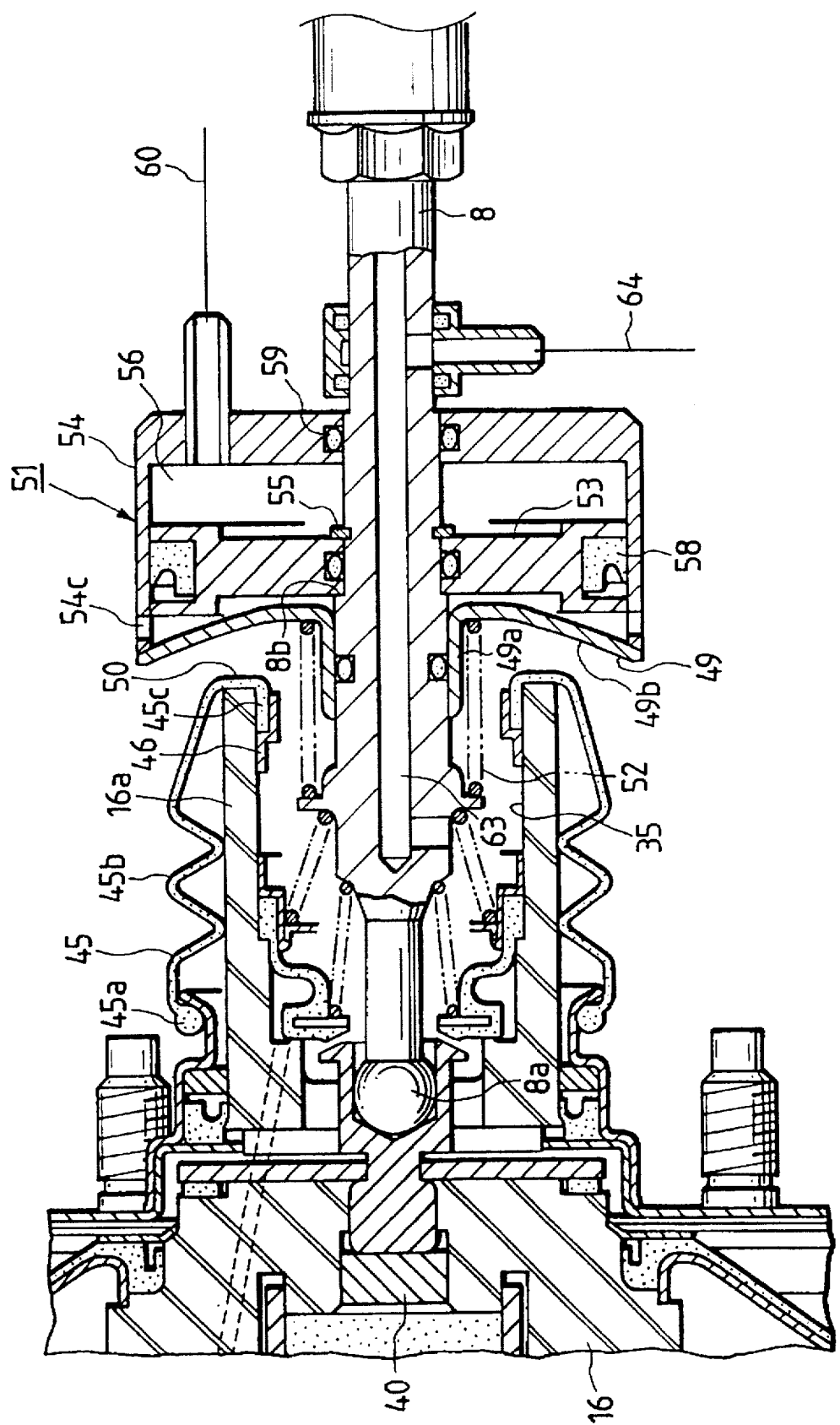
FIG. 5 is an enlarged longitudinal view showing a power brake device used in the brake system of FIG. 4.

FIGS. 4 and 5 cooperatively show a second embodiment of a brake system according to the present invention. The basic construction of the second embodiment is substantially the same as that of the first embodiment. As shown in FIG. 5, a pressure guide path 63 is additionally formed in the body of the input shaft 8. The pressure guide path 63, passing through the valve member 49, is communicated at the left end thereof with the pressure path 35, and at the right end thereof with electromagnetic valves 65 and 66 as pressure control valves, through a pipe 64 (FIG. 4). The first electromagnetic valve 65 is connected to the negative pressure supply source 6, while the second electromagnetic valve 66 is connected to the air, so that a negative pressure or air is selectively introduced into the pressure guide path 63. Normally, the electromagnetic valves are closed under control of the control unit 14.

Also in the present embodiment having additionally the pressure guide path 63, when the brake pedal 1 is not depressed, the control unit 14 deenergizes the path select valve 61, to thereby open the pressure path 35. Further, the control unit 14 deenergizes the first electromagnetic valve 65 and the second electromagnetic valve 66, to thereby close the pressure guide path 63.

When the brake pedal 1 is depressed, the stroke sensor 13 senses an amount of the depressing movement of the pedal. When the amount of the depressing movement is smaller than a preset value and a vehicle speed (derived from the speed sensor 62) is higher than a preset value, the control unit 14 energizes the path select valve 61, to thereby introduce a negative pressure to the pressure chamber 56. Thus, the valve member 49 is seated on the valve seat 50, to thereby close the pressure path 35.

Also in the present embodiment, the braking force amplifying operation of the power brake device 4 is not performed. The braking force by the regenerative brake device 3 is effectively used as in the first embodiment. The control unit 14 increases the regenerative braking force to the maximum value thereof, with increase of the amount of the depressing movement of the brake pedal.

During the course of the operation, when the stroke sensor 13 detects that the amount of the depressing movement of the brake pedal exceeds a preset value, the control unit energizes the second electromagnetic valve 66. In turn, the pressure guide path 63 is connected to the air, and air is introduced into the pressure path 35. Air is guided into the variable pressure chamber 21, through the pressure path 35, the valve mechanism 25 and the pressure varying path 33. In this case, air is gradually introduced into the variable pressure chamber 21 since an area of the cross section of the pressure guide path 63 is relatively small. Hence, there never occurs an abrupt increase of the braking force of the power brake device 4.

When a preset time elapses after the second electromagnetic valve 66 is energized, the control unit 14 deenergizes the path select valve 61 to introduce air into the pressure chamber 56. Thus, the spring 52 urges the valve member 49 to disengage from the valve seat 50 of the end tubular portion 16a, whereby air is introduced into the variable pressure chamber 21, through the pressure path 35 of the large cross sectional area. Accordingly, the power brake device 4 sufficiently amplifies the braking force with high responsibility.

The second electromagnetic valve 66 is deenergized after the path select valve 61 is deenergized and the valve member 49 disengages from the valve seat 50.

Also in the present embodiment, the power brake device 4 is incorporated into the brake system with the regenerative brake device 3 capable of varying the regenerative braking force. The power brake device 4 may be incorporated into a brake system not having the regenerative brake device 3, as a matter of course.

In an example where the power brake device 4 is incorporated into a brake system of a truck, when the truck bears a load, the valve member 49 is detached from the valve seat 50. The power brake device 4 operates to generate a large braking force.

When the truck bears no load or a light load, the valve member 49 is seated on the valve seat 50 to close the pressure path 35. The first electromagnetic valve 65 and the second electromagnetic valve 66 are properly operated to control a pressure to be introduced into the variable pressure chamber 21. Through the pressure control, the brake leverage of the power brake device 4 when the truck bears no load or a light load may be adjusted to be ½ or ⅔, for example, as large as that when the truck bears a heavy load.

In this case, a load sensor for sensing a loaded state or an empty state of the truck, and a sensor for sensing an amount of the depressing movement of the brake pedal are used. In response to the signals from those sensors, the control unit 14 properly controls the operations of the first electromagnetic valve 65 and the second electromagnetic valve 66, and controls the pressure to be introduced into the variable pressure chamber 21 in accordance with an amount of the depressing movement of the brake pedal.

Figure 6:
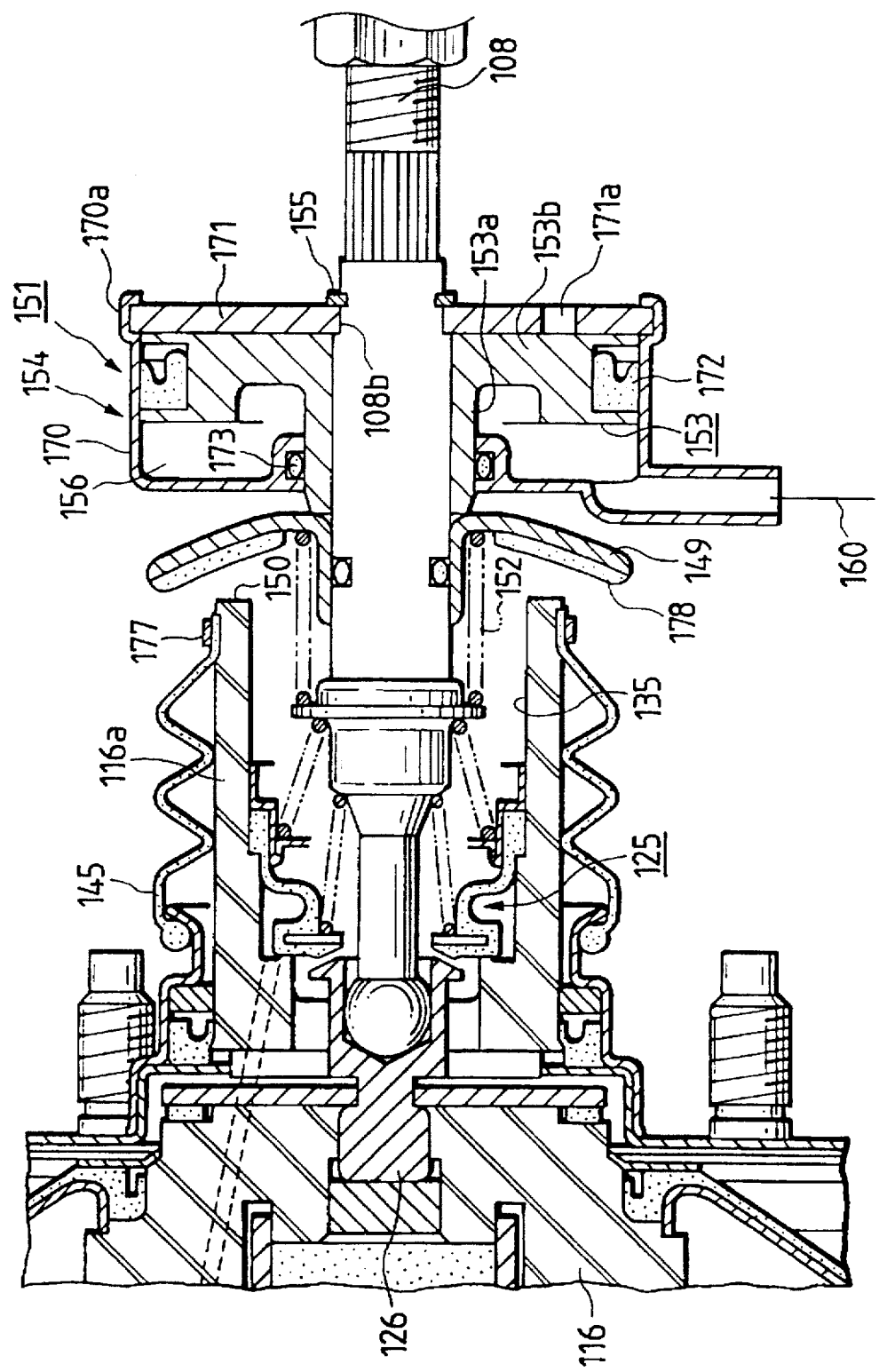
FIG. 6 is an enlarged longitudinal view showing a key portion of a brake system according to a third embodiment of the present invention.

Referring to FIG. 6, there is shown a third embodiment of a brake system according to the present invention. In the first and the second embodiments, the piston 53 of the actuator 51 is fixed to the input shaft 8, while the cylinder 54 is slidable. In the third embodiment, a cylinder 154 of an actuator 151 is fixed to an input shaft 108, while a piston 153 is slidable.

The cylinder 154 includes a cup-like shell 170 fitted to the input shaft 108, and a side wall 171 located more to the right than the cup-like shell 170. The side wall 171 is fixed to the input shaft 108 by means of a stepped part 108b of the input shaft 108 and a retainer 155 fixed to the input shaft 108. The right end engaging part 170a of the cup-like shell 170 is put on the outer surface of the side wall 171 and fixed thereto by caulking so that the cylinder 154 is fixed to the input shaft 108.

The piston 153, slidable relative to the input shaft 108, is provided with a tubular slidable portion 153a, which is extended forwardly along the outer surface of the input shaft 108, and a movable wall 153b, which is radially expanded from the right end of the slidable portion 153a. The left end portion of the slidable portion 153a is protruded forwardly from the cup-like shell 170 and is brought into contact with a valve member 149.

A pressure chamber 156 is sealed with a sealing member 172 and a sealing member 173. The sealing member 172 is put on the outer surface of the movable wall 153b, and the sealing member 173 is put on the inner surface of the left end portion of the cup-like shell 170. The pressure chamber 156 is connected to a path select valve, through a flexible conduit 160, as in the above-mentioned embodiments. A chamber that is located on the right side of the movable wall 153b is connected to the air through an opening 171a formed in the side wall 171.

In the first and the second embodiments, a part of the dust cover 45 is used for the valve seat 50 at the right end of the end tubular portion 16a. In the present embodiment, the right end of a dust cover 145 is firmly fixed onto the outer surface of the end tubular portion 116a of a valve body 116 by means of a band 177. The right end of the end tubular portion 116a is directly used as a valve seat 150. An elastic sealing member 178 is stuck onto the surface of the valve member 149, which faces the valve seat 150. The valve member 149 is slidably mounted on the input shaft 108, as already referred to. The sealing member 178 of the valve member 149 is pressed against the valve seat 150 to close a pressure path 135. In this case, the elasticity of the sealing member 178 ensures a reliable closing of the pressure path 135.

The remaining construction of the third embodiment is the same as the corresponding one of the first embodiment. Like or equivalent portions in the third embodiment are designated by like reference numerals with 100 added thereto in the figures referred to in the description of the first embodiment.

It is apparent that the third embodiment thus constructed has the similar useful effects as those of the first embodiment. The construction of the second embodiment, which includes the pressure guide path 63, and the first and the second electromagnetic valves 65 and 66, may be incorporated into the third embodiment, as a matter of course.

As seen from the foregoing description, the brake system of the present invention interruptively controls the power brake device having a braking force amplifying function. Therefore, the brake system generates a braking force optimal for a current loading state of a vehicle.

Since the regenerative braking force at a point at which the mechanical brake device starts the braking operation can be set to a larger value, the regenerative braking force is effectively used. Even if the regenerative brake device fails to operate, the pressure path is quickly opened to the air, so that the mechanical brake device is operated by a small amount of the depressing movement of the brake pedal, thereby securing an improved safety of the brake system.

What is claimed is:

1. A brake system comprising:
   a power brake device for amplifying a depressing force to a brake pedal; and
   a master cylinder capable of being driven by the power brake device for generating a brake fluid pressure, the power brake device including:
   a shell;
   a valve body slidably provided within said shell and having an end tubular portion at a rear end, the end tubular portion being extended outside the shell;
   a power piston provided on an outer surface of the valve body, and defining a fixed pressure chamber on a front side of said power piston in said shell and a variable pressure chamber on a rear side of said power piston in the shell;
   a valve mechanism provided within the valve body for selecting a fluid path;
   a pressure path formed in the end tubular portion, said pressure path opening to atmospheric air; and
   an input shaft for driving the valve mechanism to select such a fluid path as to permit air to be supplied from the pressure path to the variable pressure chamber through the selected fluid path, to thereby move the power piston forwardly, the brake system further comprising:
   a valve seat provided on and along an end face of the end tubular portion of the valve body, said valve seat partially defining the pressure path;
   a valve member slidably supported on the input shaft and disposed so that the valve member closes the pressure path when the valve member is seated on the valve seat; and
   an actuator for moving the valve member toward and away from said valve seat.

2. A brake system according to claim 1, further comprising:
   a sensor for sensing an amount of the depressing movement of the brake pedal; and
   a regenerative brake device for controlling a regenerative braking force in accordance with the amount of the depressing movement sensed by the sensor, wherein the actuator closes the pressure path by seating the valve member on the valve seat before the regenerative braking force generated by the regenerative brake device reaches a preset value, and opens the pressure path by detaching the valve member from the valve seat when the generated regenerative braking force reaches the preset value.

3. A brake system according to claim 1, wherein the actuator includes:
   a piston fixed to the input shaft;
   a cylinder slidably put supported on the input shaft and slidably receiving the piston; and
   a pressure chamber, formed within the cylinder, for displacing the cylinder forward when receiving a pressurized fluid, and wherein
   the valve member is interlocked with the cylinder.

4. A brake system according to claim 1, wherein the actuator includes:
   a cylinder fixed to the input shaft;
   a piston slidably fitted into the cylinder; and
   a pressure chamber, formed within the cylinder, for displacing the piston forward when receiving a pressurized fluid, and wherein
   the valve member is interlocked with the piston.

5. A brake system according to claims 1, further comprising:
   a pressure guide path formed in the body of the input shaft so that the pressure guide path is extended through the valve member and communicated with the pressure path; and
   pressure control valves connected to the pressure guide path for controlling a pressure introduced into the pressure guide path.

6. A brake system according to claims 1, wherein the valve member for closing the pressure path is spherical and curved substantially about a globular end as a center, the globular end being provided at a forward end of the input shaft.

7. A brake system comprising:

power braking means for introducing atmospheric air pressure into a variable chamber through a pressure path, amplifying a depressing force using a difference between negative pressure and the atmospheric air pressure, and transmitting thus amplified depressing force to a master cylinder to brake a vehicle, the power braking means having valve means for selectively communicating the variable chamber with the pressure path; and suspending means for preventing the atmospheric air pressure from being introduced into the variable chamber even after the valve means has communicated the variable chamber with the pressure path.

8. A brake system according to claim 7, wherein the suspending means includes:

a valve seat located at an open end of the pressure path;

a valve member facing the valve seat and movable toward and away from the valve seat; and an actuator for moving the valve member and making the valve member contact the valve seat to close the open end of the pressure path.

9. A brake system according to claim 7, further comprising:

sensing means for sensing a magnitude of the depressing force;

regenerative braking means for producing a regenerative force to brake the vehicle;

control means for controlling the regenerative braking means so that the regenerative force increases in accordance with the sensed magnitude of the depressing force, and controlling the suspending means so that the atmospheric air pressure is introduced into the variable chamber through the pressure path after the increasing regenerative force has reached a preset value.

10. A brake system according to claim 3, further comprising:

a path select valve connected to a pressure introduction hole of the actuator, and selectively activated for producing a pressure difference in the actuator to move the cylinder forward.

11. A brake system according to claim 4, further comprising:

a path select valve connected to a pressure introduction hole of the actuator, and selectively activated for producing a pressure difference in the actuator to move the piston forward.

* * * * *